United States Patent
Kim

(10) Patent No.: US 9,920,898 B2
(45) Date of Patent: Mar. 20, 2018

(54) VEHICULAR ACTIVE STOP AND TAIL LAMP MODULE

(71) Applicant: LG Electronics Inc., Seoul (KR)

(72) Inventor: Jongwoo Kim, Seoul (KR)

(73) Assignee: LG Electronics Inc., Seoul (KR)

(*) Notice: Subject to any disclaimer, the term of this patent is extended or adjusted under 35 U.S.C. 154(b) by 20 days.

(21) Appl. No.: 15/053,396

(22) Filed: Feb. 25, 2016

(65) Prior Publication Data

US 2016/0252229 A1    Sep. 1, 2016

(30) Foreign Application Priority Data

Feb. 26, 2015  (KR) .................. 10-2015-0027115

(51) Int. Cl.
| | |
|---|---|
| *F21V 17/02* | (2006.01) |
| *F21S 8/10* | (2006.01) |
| *B60Q 1/26* | (2006.01) |
| *B60Q 1/44* | (2006.01) |

(52) U.S. Cl.
CPC .......... *F21S 48/234* (2013.01); *B60Q 1/2607* (2013.01); *B60Q 1/44* (2013.01); *F21S 48/211* (2013.01); *F21S 48/215* (2013.01); *F21S 48/217* (2013.01); *F21S 48/2206* (2013.01); *F21S 48/2243* (2013.01); *F21S 48/232* (2013.01); *F21S 48/24* (2013.01)

(58) Field of Classification Search
CPC .................................................. F21S 48/234
See application file for complete search history.

(56) References Cited

U.S. PATENT DOCUMENTS

| | | | | |
|---|---|---|---|---|
| 5,971,574 A * | 10/1999 | Taniuchi | ................ | B60Q 1/076 362/286 |
| 6,059,435 A * | 5/2000 | Hamm | ................ | F21S 48/1731 362/284 |
| 6,334,702 B1 * | 1/2002 | Albou | ...................... | B60Q 1/14 362/465 |
| 6,341,884 B1 * | 1/2002 | Leleve | .................... | B60Q 1/12 362/282 |
| 7,275,846 B2 * | 10/2007 | Browne | .............. | F21S 48/1778 362/467 |

(Continued)

FOREIGN PATENT DOCUMENTS

| | | |
|---|---|---|
| DE | 10260383 | 7/2004 |
| EP | 2703218 | 3/2014 |

(Continued)

OTHER PUBLICATIONS

Extended European Search Report issued in European Application No. 16157563.4 dated Jul. 11, 2016, 9 pages.

*Primary Examiner* — Thien M Le
*Assistant Examiner* — Asifa Habib
(74) *Attorney, Agent, or Firm* — Fish & Richardson P.C.

(57) ABSTRACT

A vehicular light module includes a light source configured to have a position that is adjustable longitudinally along a direction in which light radiates from the light source. The light module also includes a lighting guide that is movably disposed and that is configured to reflect and diffuse the light radiated from the light source. The light module further includes a moving unit configured to move the lighting guide to adjust the reflection and the diffusion of the light radiated from the light source by the lighting guide.

16 Claims, 12 Drawing Sheets

(56) References Cited

U.S. PATENT DOCUMENTS

| | | | |
|---|---|---|---|
| 8,622,597 B2* | 1/2014 | Tseng | F21S 48/1159 362/515 |
| 2003/0206418 A1* | 11/2003 | Strazzanti | B60Q 1/00 362/540 |
| 2007/0091630 A1* | 4/2007 | Eichelberger | F21S 48/1159 362/512 |
| 2008/0055918 A1* | 3/2008 | Mascadri | F21S 48/1757 362/475 |
| 2008/0198372 A1* | 8/2008 | Pan | B60Q 1/38 356/121 |
| 2009/0122567 A1* | 5/2009 | Mochizuki | F21S 48/1159 362/509 |
| 2011/0121733 A1* | 5/2011 | Choi | B60Q 1/122 315/82 |
| 2015/0258928 A1* | 9/2015 | Goto | B60Q 1/085 701/49 |

FOREIGN PATENT DOCUMENTS

| | | |
|---|---|---|
| FR | 2759651 | 8/1998 |
| FR | 2977001 | 12/2012 |
| JP | 2009-043488 | 2/2009 |
| JP | 2009075340 | 4/2009 |
| JP | 2010080212 | 4/2010 |
| JP | 2014-154219 | 8/2014 |
| KR | 200380426 | 3/2005 |
| KR | 10-2010-0058095 | 6/2010 |
| KR | 10-1397588 | 5/2014 |

* cited by examiner (LIGHTING OF STOP LAMP)

(LIGHTING OF TAIL LAMP)

(LIGHTING OF STOP LAMP)

(LIGHTING OF TAIL LAMP)

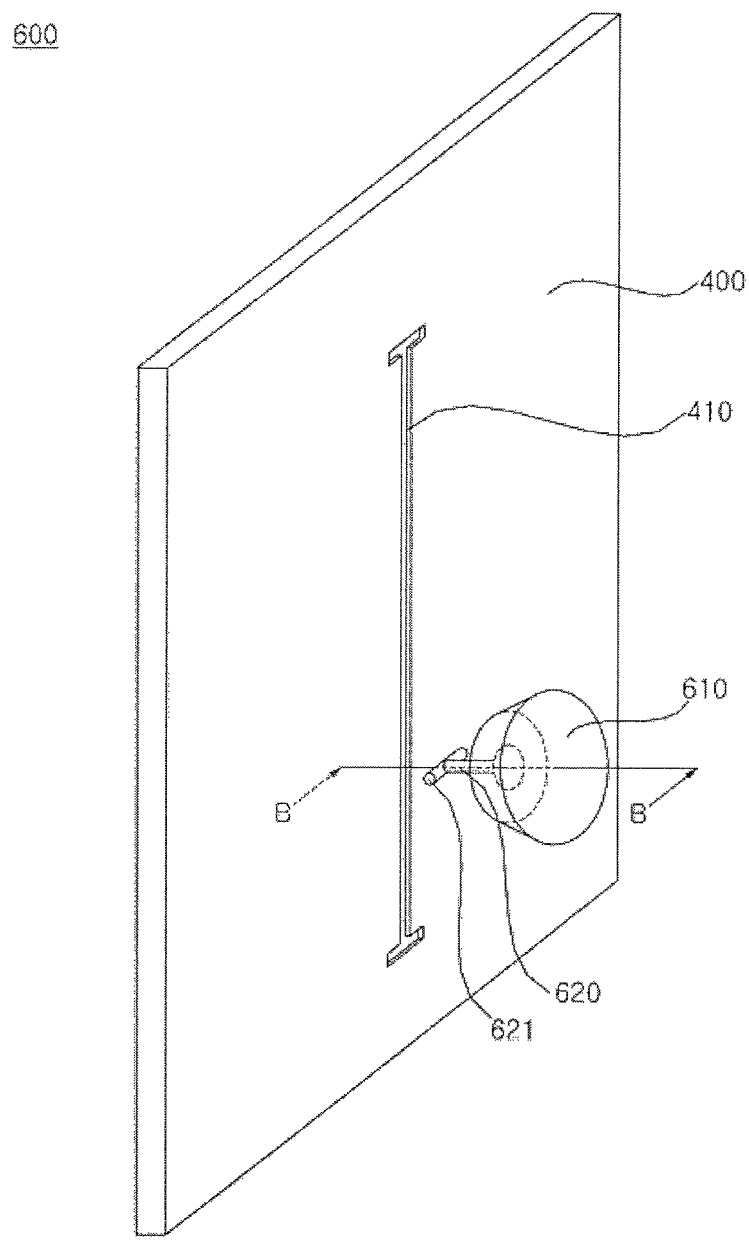

FIG. 8

|  | LIGHTING OF STOP LAMP | SOLENOID DRIVE UNIT | LIGHTING OF TAIL LAMP | SOLENOID DRIVE UNIT |
|---|---|---|---|---|
| Case1 | ②On | Up | ①,②On | Down |
| Case2 | ②On | Up | ①,③On | Down |
| Case3 | ②On | Up | ①On | Down |
| Case4 | ②On | Up | ②On | Down |
| Case5 | ②On | Up | ③On | Down |

VEHICULAR ACTIVE STOP AND TAIL LAMP MODULE

CROSS-REFERENCE TO RELATED APPLICATION

This application claims an earlier filing date and right of priority to Korean Patent Application No. 10-2015-0027115, filed on Feb. 26, 2015 in the Korean Intellectual Property Office, the content of which is incorporated herein by reference in its entirety.

TECHNICAL FIELD

The present disclosure relates to a vehicular stop and tail lamp module.

BACKGROUND

A vehicle is typically provided with a stop and tail lamp module at the rear of the vehicle. The stop and tail lamp module illuminates the rear of the vehicle and also indicates when the vehicle is stopping, thereby assisting other vehicles travelling behind the vehicle to maintain a safe distance while driving at night or in bad weather.

SUMMARY

Systems and techniques are disclosed that enable a vehicular light module that adjustably operates in both a tail lighting mode and a stop lighting mode.

In one aspect, a vehicular light module includes a light source configured to have a position that is adjustable longitudinally along a direction in which light radiates from the light source. The vehicular light module also includes a lighting guide that is movably disposed and that is configured to reflect and diffuse the light radiated from the light source. The vehicular light module further includes a moving unit configured to move the lighting guide to adjust the reflection and the diffusion of the light radiated from the light source by the lighting guide.

In some implementations, the vehicular light module further includes a housing configured to accommodate and mount the light source, the lighting guide, and the moving unit.

In some implementations, the vehicular light module further includes a movable plate coupled to the moving unit and configured to connect the moving unit with the light source and the lighting guide.

In some implementations, the vehicular light module further includes a movable plate coupled to the moving unit and configured to connect the moving unit with the lighting guide.

In some implementations, the light source and the lighting guide are disposed on a first side of the movable plate facing the direction in which the light source radiates light, and the moving unit is disposed on a second side of the movable plate facing a direction that is opposite to the direction in which the light source radiates light.

In some implementations, the lighting guide includes a plurality of guide panels that are hingedly coupled to the movable plate and configured to allow variation of an angle between the plurality of guide panels and the movable plate.

In some implementations, each of the plurality of guide panels is longitudinally adjustable between a square shape and a rectangular shape.

In some implementations, each of the plurality of guide panels has a width that increases with increasing distance from the movable plate.

In some implementations, the light source includes an LED module configured to generate light having a predetermined luminance, and a diffusing plate configured to diffuse light that is radiated from the LED module. The light source also includes a back plate coupled to the movable plate and configured to accommodate the LED module and the diffusing plate, the back plate configured to connect the main light source to the moving unit. The light source further includes an LED cover configured to cover the LED module accommodated in the back plate.

In some implementations, the back plate of the light source is integral with the movable plate.

In some implementations, the moving unit includes a movable rod coupled at an end thereof to the movable plate; and a solenoid drive unit configured to move the movable rod.

In some implementations, the moving unit is configured to move the light source and the lighting guide between a first configuration corresponding to a tail lighting mode and a second configuration corresponding to a stop lighting mode. A first surface area of the lighting guide in the first configuration corresponding to the tail lighting mode is smaller than a second surface area of the lighting guide in the second configuration corresponding to the stop lighting mode, as viewed from the direction in which light radiates from the light source.

In some implementations, the moving unit is configured to move the light source and the lighting guide between a first configuration corresponding to a tail lighting mode and a second configuration corresponding to a stop lighting mode. A first diameter defined by outer ends of the plurality of guide panels of the lighting guide in the first configuration corresponding to the tail lighting mode is smaller than a second diameter defined by the outer ends of the plurality of guide panels of the lighting guide in the second configuration corresponding to the stop lighting mode, as viewed from the direction in which light radiates from the light source.

In some implementations, the vehicular light module further includes a moving guide unit configured to guide a movement of the lighting guide.

In some implementations, the moving guide unit includes a first retainer part fitted at one end thereof into a moving slot located in a back surface of the lighting guide; and a second retainer part positioned opposite to the first retainer part and coupled to a mounting portion provided on the housing via a ball joint connection.

In another aspect, a vehicular light module includes a housing disposed at a rear portion of a vehicle body, and at least two light sources disposed in the housing. The vehicular light module also includes a lighting guide that is movably disposed and that is configured to converge and diffuse, in a rearward direction of the vehicle body, light that is radiated from at least one of the at least two light sources. The vehicular light module further includes a moving unit configured to move the lighting guide to adjust the convergence and the diffusion of the light radiated from the at least two light sources by the lighting guide.

In some implementations, the vehicular light module further includes a movable plate coupled to the moving unit and configured to connect the lighting guide to the moving unit. The at least two light sources include at least two of: a main light source disposed on the movable plate; a first subsidiary light source disposed on the lighting guide; or a second subsidiary light source disposed on an inner surface of the lamp housing.

In some implementations, in a stop lighting mode: the first subsidiary light source of the at least two light sources is turned on, and the moving unit moves the lighting guide in a manner such that a first surface area of the lighting guide in a stop lighting mode is larger than a second surface area of the lighting guide in a tail lighting mode, as viewed from a direction in which light radiates from the at least two light sources.

In some implementations, in a tail lighting mode: at least one of the at least two light sources is turned on, and the moving unit moves the lighting guide in a manner such that a first surface area of the lighting guide in a stop lighting mode is larger than a second surface area of the lighting guide in a tail lighting mode, as viewed from a direction in which light radiates from the at least two light sources.

The details of one or more implementations are set forth in the accompanying drawings and the description below. Other features will be apparent from the description and drawings, and from the claims. The description and specific examples below are given by way of illustration only, and various changes and modifications will be apparent.

BRIEF DESCRIPTION OF THE DRAWINGS

FIG. 6A is a diagram illustrating an exploded perspective view of an example of a moving guide unit;

FIG. 8 is a diagram illustrating an example of a control table showing the lighting states of respective light sources and operational states of the solenoid drive unit of the vehicular active stop and tail lamp module shown in FIG. 7 in various cases.

DETAILED DESCRIPTION

A stop and tail lamp module may be controlled to operate in both a tail lamp lighting mode and a stop lamp lighting mode. In a tail lamp lighting mode, the lamp module operates as a tail lamp that radiates light having a predetermined intensity of luminance in a rearward direction, thus making the vehicle visible from behind while driving at night or in bad weather. In a stop lamp lighting mode, the lamp module operates as a stop lamp that radiates light having a higher luminance than that in the tail lamp lighting mode when the vehicle undergoes a braking operation, thereby providing a clear indication that the vehicle is stopping.

However, providing such different levels of luminescence may be a challenge. For example, it may be difficult to provide at least two different physical light sources, which are able to radiate light having different luminances suitable for the tail lamp lighting mode and the stop lamp lighting mode. Furthermore, having at least two different physical light sources may cause challenges related to the allocation of space in the vehicle for accommodating the stop and tail lamp module.

In addition, if the vehicular active stop and tail lamp module merely employs the inherent luminances of the light sources, then it may be a challenge to actively respond to the traveling condition of the vehicle.

Systems and techniques are disclosed herein that enable a vehicular active stop and tail lamp module configured to efficiently and adjustably operate in both a tail lamp lighting mode and a stop lamp lighting mode using a light source having a single luminance.

In some implementations, the active stop and tail lamp module is configured to actively respond to the traveling conditions of the vehicle by selectively operating a plurality of light sources and controlling the light-emitting surface area of a lighting guide, which serves to converge and diffuse the light radiated from the light sources.

As an example, the lighting guide may be configured with a plurality of guide panels arranged in a fan-shaped configuration. The fan-shaped guide panels may adjustably expand and retract to change the overall light-emitting surface area of the lighting guide, thereby adjusting the amount of light that is visible from behind the vehicle depending on whether the lamp module is operating in a tail lamp lighting mode or a stop lamp lighting mode. As such, the active stop and tail lamp module may dynamically adjust between both tail lamp and stop lamp functionality in an efficient manner and provide increased visibility of the vehicle from behind.

Figure 1:
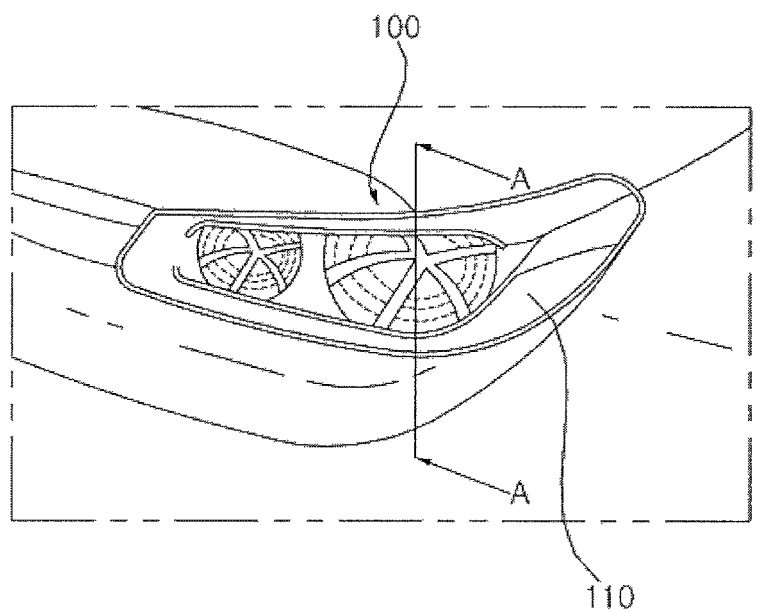
FIG. 1 is diagram illustrating a perspective view of the rear appearance of an example of a vehicle body equipped with a vehicular active stop and tail lamp module.
Figure 2A:
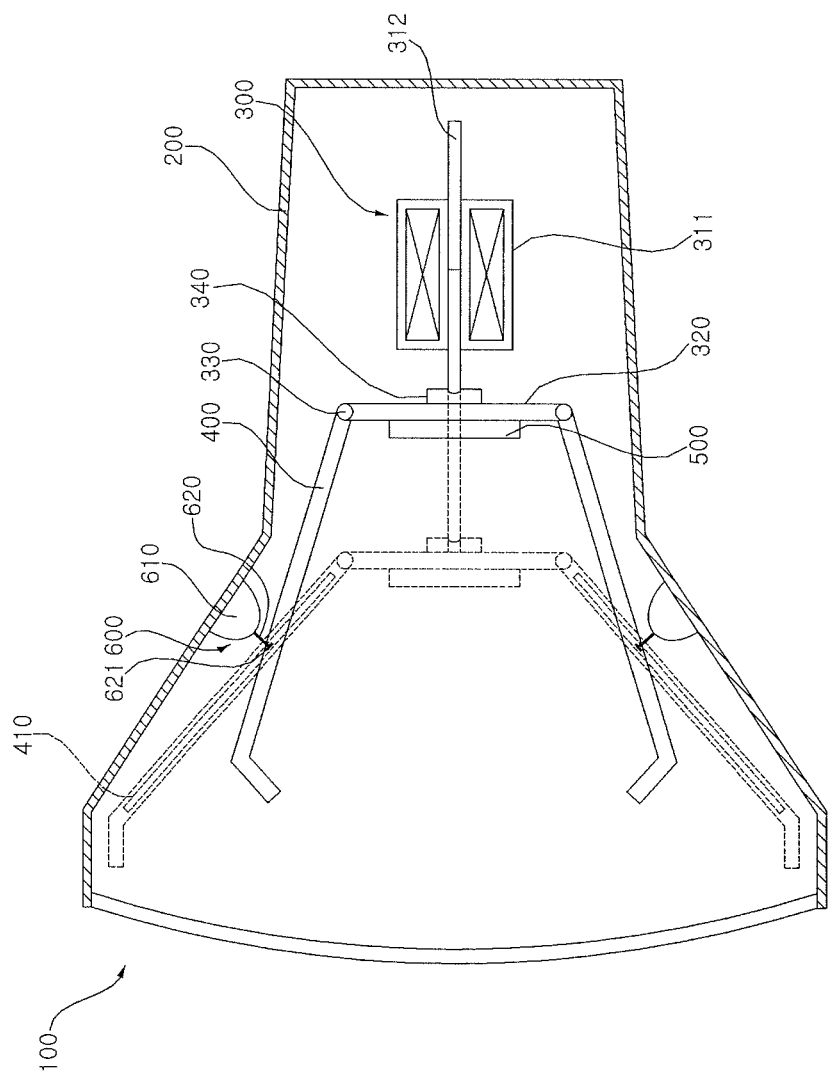
FIGS. 2A to 2C are diagrams illustrating cross-sectional views taken along line A-A in FIG. 1, showing an example of an operation of a vehicular active stop and tail lamp module.
Figure 2B:
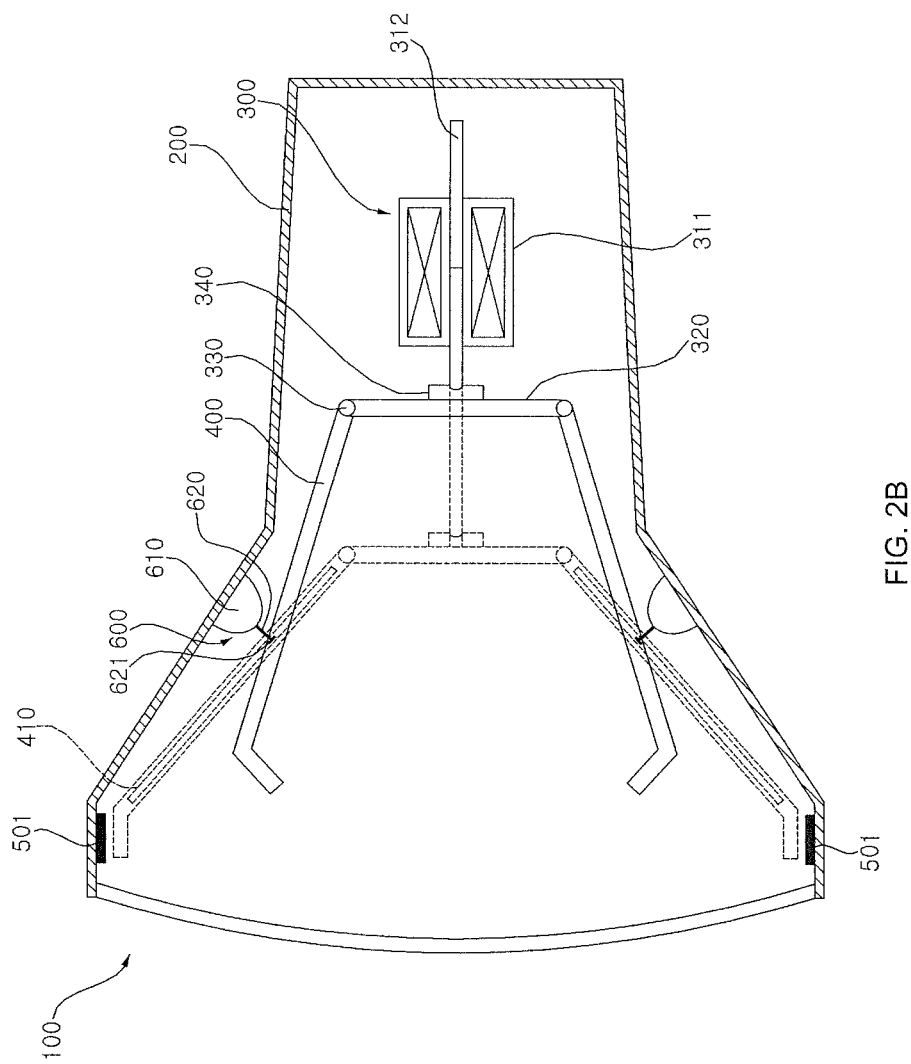
Figure 2C:
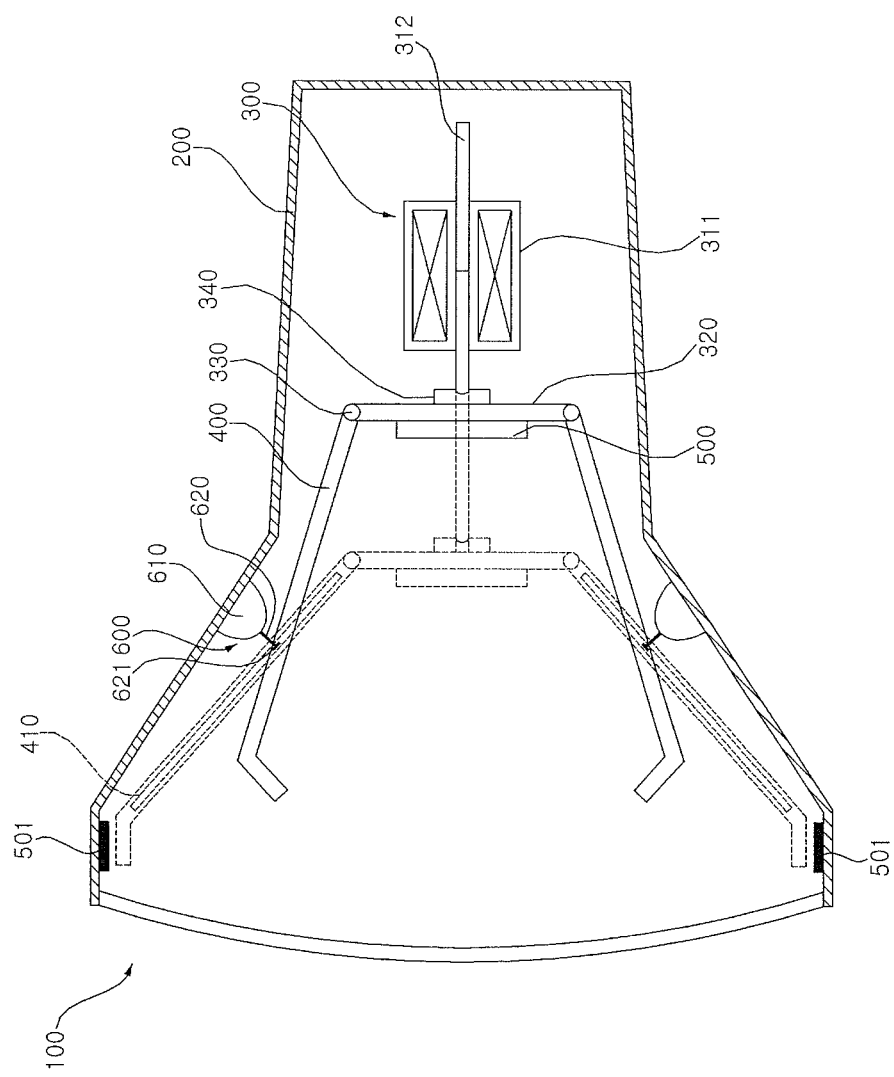

FIG. 1 is a perspective view showing the rear appearance of a vehicle body equipped with the vehicular active stop and tail lamp module. FIGS. 2A to 2C are cross-sectional views taken along line A-A in FIG. 1, which shows the operation of the vehicular active stop and tail lamp module.

As shown in FIGS. 1 to 2B, the vehicular active stop and tail lamp module 100 includes a light source 500, which is movable in the direction in which light radiates and which creates and radiates light, a lighting guide 400, which is movable so as to reflect the light radiated from the light source 500 and diffuse the light in the direction in which the light radiates, and a moving unit 300 for moving the light source 500 and/or the lighting guide 400.

The light source 500, the lighting guide 400 and the moving unit 300 may be accommodated in a lamp housing 200 mounted on the rear part 110 of a vehicle body.

The vehicular active stop and tail lamp module 100, which is provided at the rear part 110 of the vehicle body, fundamentally serves to increase the visibility of the vehicle by radiating light in the rearward direction of the vehicle during rearward parking or rearward traveling of the vehicle. In addition, the vehicular active stop and tail lamp module also eventually serves to allow a vehicle, which travels behind the associated vehicle, to maintain a safe distance while driving at night or in bad weather in which a visual range is short, and serves to enable the following vehicle to easily perceive the associated vehicle, at the time of a braking operation and emergency stoppage of the vehicle, thereby preventing the occurrence of accidents.

In particular, it is required to give the following vehicle a warning with a higher luminance in a stop lamp control mode than that in a typical tail lamp control mode. However, vehicles have fulfilled the above warning functions using light sources having different luminous intensities, as described above.

The vehicular active stop and tail lamp module 100 suggests a technical feature of being capable of being controlled to be operated both in the tail lamp lighting mode and the stop lamp lighting mode using a single light source 500 or 501, which radiates light having an unchanging luminance.

However, implementations are not necessarily limited to the single light source 500 or 501, and may also include a main light source 500 and a subsidiary light source 501, as illustrated in FIG. 2C.

An example, in which a single light source 500 or 501, which radiates light having a constant luminance, will be first described in detail.

More specifically, the vehicular active stop and tail lamp module, which includes the single light source 500 or 501 as the light source for radiating light, operates in a manner such that a lighting guide 400, which serves to reflect the light radiated from the light source 500 or 501 so as to provide a larger light-emitting surface area than that of the actual light source 500 or 501, is moved such that the light-emitting surface area is reduced when the lamp module is controlled to be operated in the tail lamp lighting mode but is increased when the lamp module is controlled to be operated in the stop lamp lighting mode.

Figure 3A:
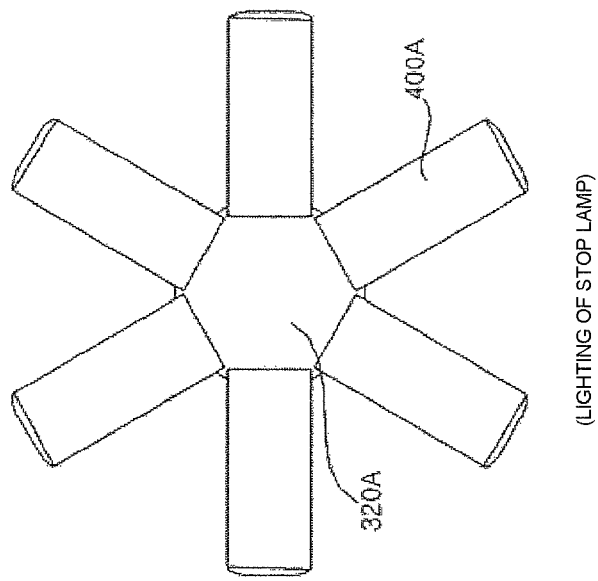
FIGS. 3A and 3B are diagrams illustrating plan views of various implementations of a lighting guide.
Figure 3A:
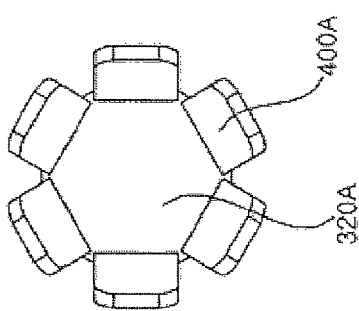
Figure 3B:
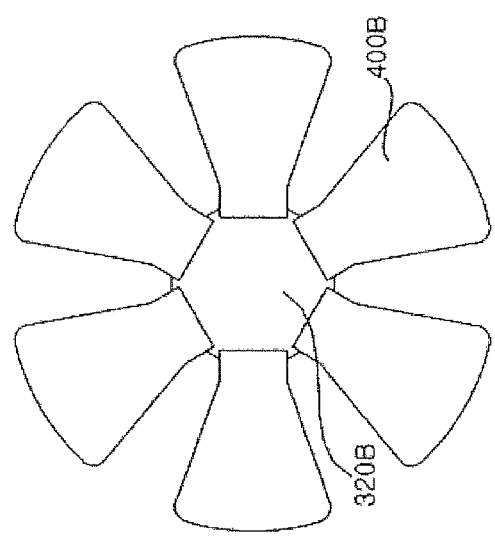
Figure 3B:
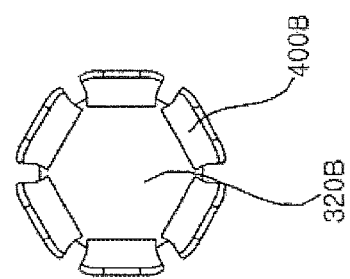

FIGS. 3A and 3B are plan views illustrating various implementations of the lighting guide 400.

The lighting guide 400 serves to reflect the light, radiated from the light source 500, in the rearward direction of the vehicle body so as to increase the light-emitting surface area of the light source 500, which is actually small.

The light guide 400 includes a plurality of guide panels, which are disposed in the lamp housing 200 so as to surround the central light source (hereinafter, referred to as "main light source", and denoted by reference number "500") in a circular manner, and which extends a predetermined distance in the rearward direction of the vehicle body so as to define an approximately obtuse angle with respect to the light-emitting surface of the main light source 500, that is, the vertical surface.

In a vehicular active stop and tail lamp module 100, the lighting guide 400 may be constituted by square guide panels 400A, which are elongated longitudinally so as to have a rectangular shape, as illustrated in FIG. 3A, or fan-shaped guide panels 400B, which are increased in width with increasing distance from the main light source 500, as illustrated in FIG. 3B.

As illustrated in FIGS. 2A to 2C, a vehicular active stop and tail lamp module may further include a movable plate 320, which is coupled to the moving unit 300 and serves as the intermediate for connecting the main light source 500 and the lighting guide 400 to the moving unit 300.

Although the movable plate 320 fundamentally serves as the intermediate for connection of the main light source 500, it also serves to provide a place on which to rotatably mount the lighting guide 400, which is movable.

Based on the movable plate 320, the light source 500 and the lighting guide 400 may be disposed in the direction in which the light source 500 radiates light (i.e. at the rear part 110 of the vehicle body), and the moving unit 300 may be disposed in the opposite direction (i.e. the front part (which should be construed as being located at a forward position relative to the rear part 110)).

As shown in FIGS. 2A to 2C, the plurality of guide panels 400B of the lighting guide 400 may be hingedly coupled to the movable plate 320 such that the coupling angle defined between the guide panels 400B and the movable plate 320 varies as the movable plate 320 is moved.

Specifically, the respective guide panels 400B of the lighting guide 400 may be coupled to the movable plate 320 by means of ball joints. However, the means for coupling the guide panels 400B to the movable plate 320 is not limited to the ball joint, and the ends of the guide panels 400B of the lighting guide 400 may, of course, be coupled to the movable plate 320 by means of hinges 330.

As illustrated in FIGS. 3A and 3B, the lighting guide 400 is movable such that the respective guide panels 400B, which are considered to be the substantial light-emitting surface, are folded and the diameter defined by the outer ends of the guide panels 400B is reduced when the lamp module is controlled to be operated in the tail lamp lighting mode, and such that the diameter defined by the outer ends of the guide panels 400B is increased so as to increase the light-emitting surface area when the lamp module is controlled to be operated in the stop lamp lighting mode.

The movable plate 320 and the lighting guide 400 are preferably constructed from a suitable material capable of converging and diffusing the incident light. It is not necessary for the main light source 500, which is provided on the movable plate 320, or the subsidiary light source 501, which is provided at a place other than the movable plate 320, to be positioned in front of the movable plate 320 and the lighting guide 400 based on the direction in which light radiates. In other words, even when the main light source 500 or the subsidiary light source 501 is positioned behind the movable plate 320 and the lighting guide 400 based on the radiation direct of light, the movable plate 320 and the lighting guide 400 may converge the light, which is radiated toward the rear part 110 of the vehicle body from the main light source 500 or the subsidiary light source 501, and may diffuse the light rearward, thereby enabling the driver in the following vehicle to perceive the radiated light.

As illustrated in FIGS. 2B and 2C, the subsidiary light source 501 may be disposed on the inner surface of the lamp housing 200, which is covered by the lighting guide 400.

An example, in which the lamp module is provided with both the main light source 500 and the subsidiary light source 501, will now be described.

As illustrated in FIG. 2C, the main light source 500 may be provided on the movable plate 320, and the subsidiary light source 501 may be provided on the inner surface of the lamp housing 200.

The control procedure for operating the lamp module in the stop lamp lighting mode and the tail lamp lighting mode in the case in which both the main light source 500 and the subsidiary light source 501 are included will be described later.

Figure 4:
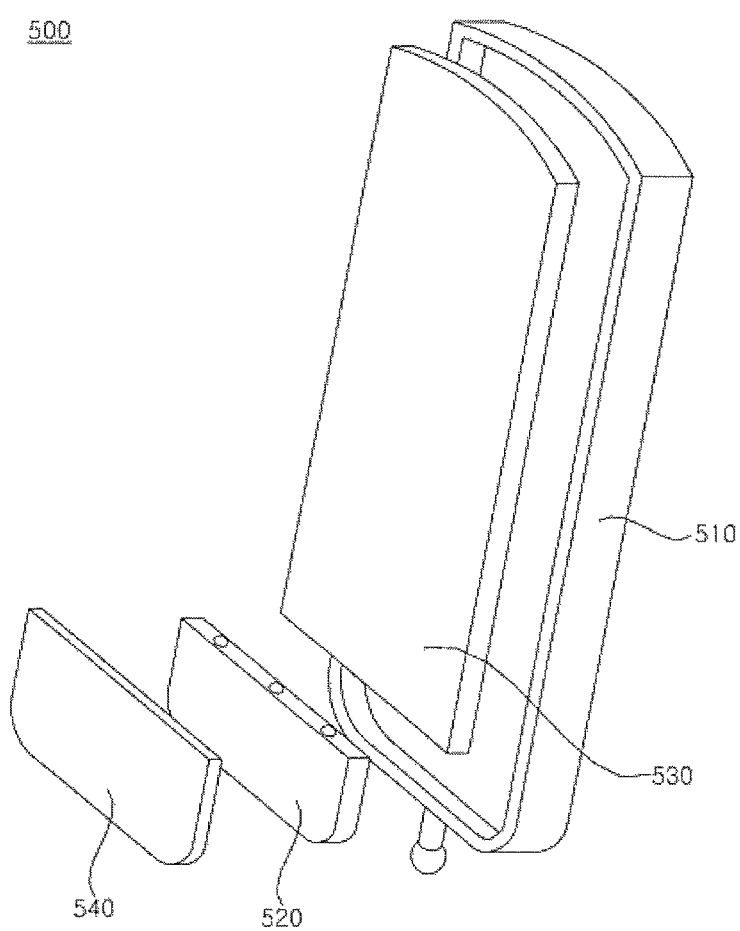
FIG. 4 is a diagram illustrating an exploded perspective view of an example of a main light source.
Figure 5:
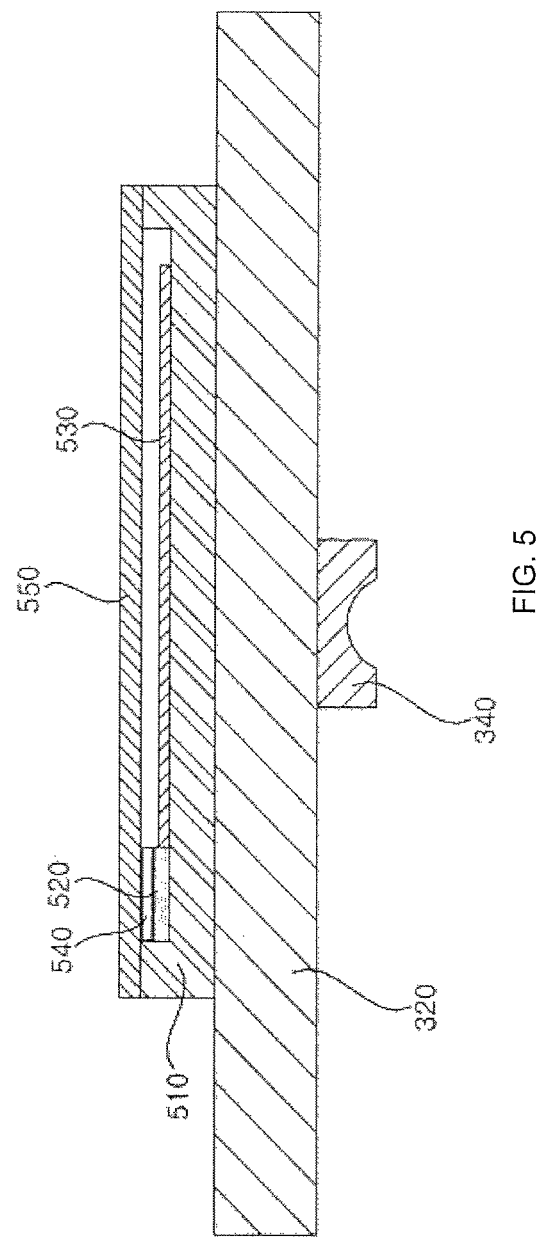
FIG. 5 is diagram illustrating a cross-sectional view of an example of a main light source.

FIG. 4 is an exploded perspective view showing the main light source 500, among the components shown in FIGS. 2A to 2C. FIG. 5 is a cross-sectional view showing the main light source 500, among the components shown in FIGS. 2A to 2C.

As illustrated in FIGS. 4 and 5, the main light source 500 includes an LED module 520 for creating light by supplying power, a diffusing plate 530 adapted to diffuse the light radiated from the LED module 520, a back plate 510, which accommodates the LED module 520 and the diffusing plate 530 and which is coupled to the movable plate 320, which serves as the intermediate for connecting the main light source 500 to the moving unit 300, and an LED cover 540 for covering the LED module 520 accommodated in the back plate 510. Although the specific configurations of the respective components of the main light source 500 are not shown in the drawings, the specific configurations of the respective components may, of course, be applied to the respective components of the subsidiary light source 501.

Here, the LED module 520 is an LED light emitter on which a plurality of LEDs are mounted, and the diffusing plate 530 is made of a transparent or opaque material so as to diffuse the light radiated from the LED module 520.

The LED cover 540 serves to prevent the light emitted from the LED module 520 from being radiated in the rearward direction of the vehicle body, thereby guiding all of the light radiated from the LED module 520 toward the diffusing plate 530, which is disposed adjacent to the LED module 520.

Here, the back plate 510 of the main light source 500 and the movable plate 320 may be integrally formed with each other. Specifically, the movable plate 320 may be configured to have an accommodating recess formed in a portion of the front surface thereof so as to accommodate the LED module 520 and the diffusing plate 530.

As illustrated in FIG. 5, the main light source 500 may further include an inner lens 550, which is disposed to cover the LED module 520 and the diffusing plate 530 so as to block the infiltration of pollutants such as dust.

In the vehicular active stop and tail lamp module 100, the moving unit 300 includes a movable rod 312, which is coupled at an end thereof to the movable plate 320, and a solenoid drive unit 311 for moving the movable rod 312 in a solenoid-actuating manner, as illustrated in FIGS. 2A to 2C.

Of course, the solenoid drive unit 311 is constructed to move the movable rod 312, which is disposed at the center thereof, using an electric field, which is generated by the application of power.

The moving speed of the movable rod 312 is preferably set such that the movable rod 312 is driven within a time of 150 ms after braking action of the vehicle, which is a response speed specified in relevant regulations. In some implementations, the response speed of the movable rod 312, which is moved by the solenoid drive unit 311, may be set to be within a time of 20 ms after the braking action of the vehicle.

Figure 6B:
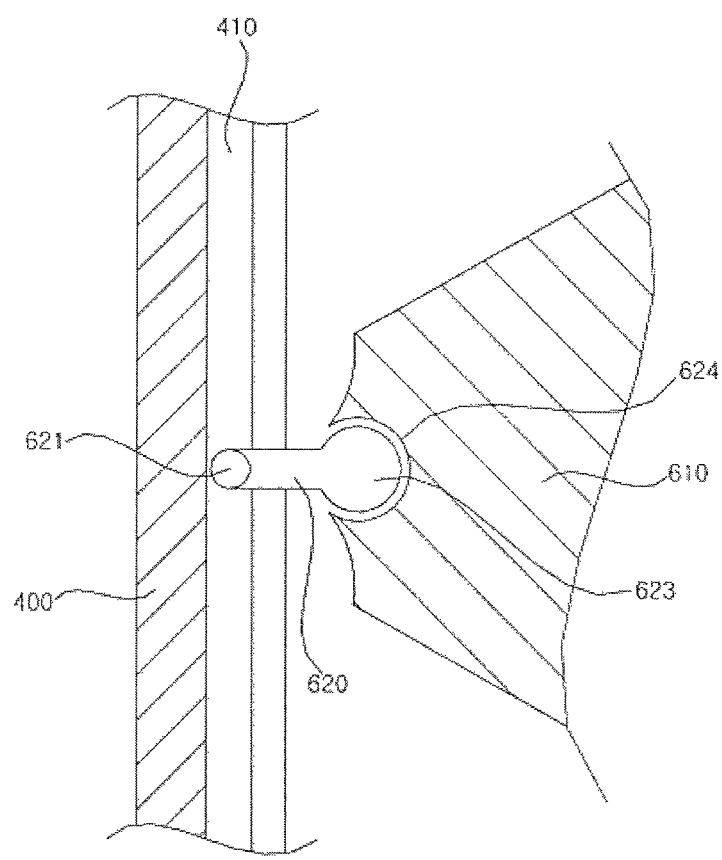
FIG. 6B is a diagram illustrating a cross-sectional view taken along line B-B in FIG. 6A.

FIG. 6A is an exploded perspective view showing a moving guide unit 600 among the components shown in FIGS. 2A to 2C. FIG. 6B is a cross-sectional view taken along line B-B in FIG. 6A.

As illustrated in FIGS. 6A and 6B, the vehicular active stop and tail lamp module 100 may further include the moving guide unit 600 for guiding the movement of the lighting guide 400.

The moving guide unit 600 includes a retainer 620. More specifically, the retainer 620 includes a first retainer part 621, which is fitted at one end thereof into a moving slot 410 formed in the back surface of the lighting guide 400 (the surface of the lighting guide 400, which is positioned opposite the surface to which the light from the main light source 500 is radiated), and a second retainer part 623, which is positioned opposite the first retainer part 621 and is coupled to a mounting portion 610 provided on the lamp housing 200 in a ball joint manner.

The first retainer part 621 is a coupling member, which is configured to have an approximate 'T' shape and which is fitted into the moving slot 410 so as to hold the associated guide panel which is being moved. The second retainer part 623 is configured to have an approximately spherical shape, and is fitted into a ball joint coupling recess 624 formed in the mounting portion 610 so as to smoothly guide the guide panel during the movement of the guide panel.

Figure 7:
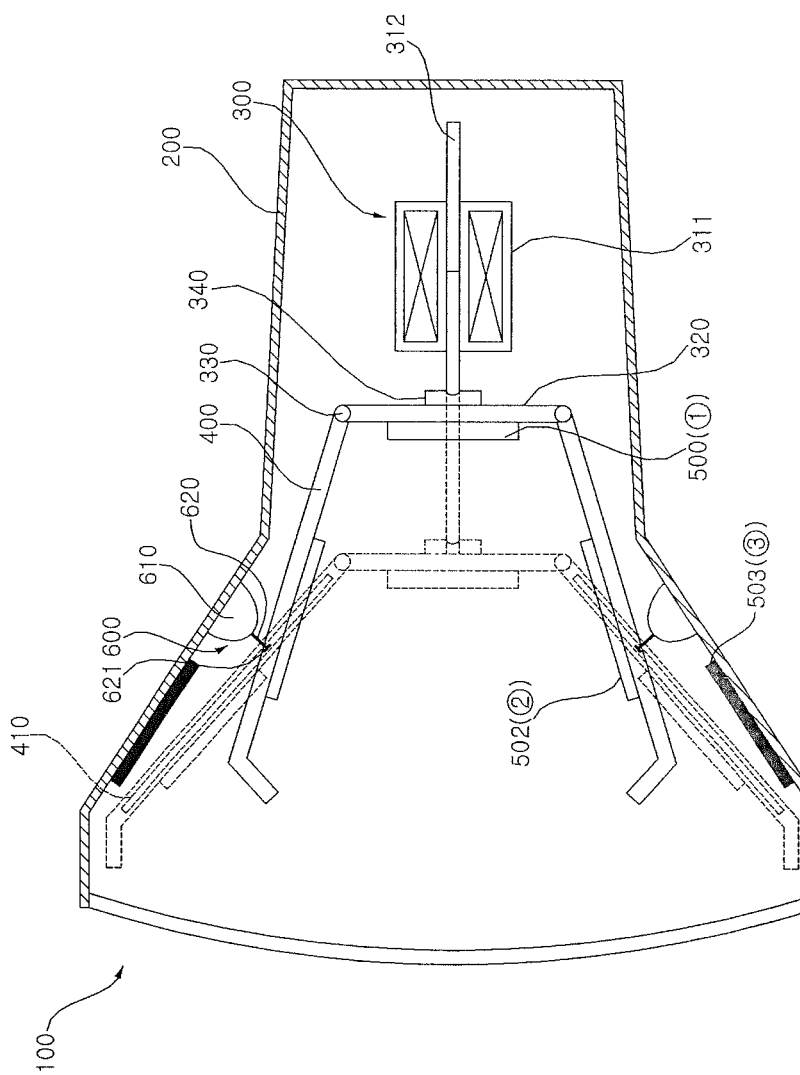
FIG. 7 is a diagram illustrating a cross-sectional view taken along line A-A in FIG. 1, showing an example of an operation of a vehicular active stop and tail lamp module according to another implementation.

FIG. 7 is a cross-sectional view taken along line A-A in FIG. 1, which shows the operation of a vehicular active stop and tail lamp module. FIG. 8 is a control table, which shows the lighting states of respective light sources and the operational states of the solenoid drive unit of the vehicular active stop and tail lamp module shown in FIG. 7 in various cases.

In the vehicular active stop and tail lamp module shown in FIG. 7, the light source may include three light sources, which are disposed at three positions in the lamp housing 200.

As in the previous implementation, the main light source 500 may be provided on the movable plate 320. A first subsidiary light source 502 may be attached to the guide panel 400B of the lighting guide 400, or may be embodied by the guide panel 400B itself. A second subsidiary light source 503 may be provided on the portion of the inner surface of the lamp housing 200 that is covered by the lighting guide 400.

In the case of including the plurality of light sources 500, 502 and 503 as described above, for the purpose of efficiently controlling the lamp module, it is preferable to control the respective light sources and the solenoid drive unit 311 to be operated as shown in FIG. 8.

For the convenience of explanation, the main light source 500 is denoted by '①', the first subsidiary light source 502 is denoted by '②', and the second subsidiary light source 503 is denoted by '③'. Furthermore, controlling the solenoid drive unit 311 to increase the light-emitting surface area of the lighting guide 400 is briefly designated by 'Up', and controlling the solenoid drive unit 311 to decrease the light-emitting surface area of the lighting guide 400 is briefly designated by 'Down'.

The process of controlling the operation of the light sources ①, ② and ③ and the solenoid drive unit 311 will now be described with reference to FIG. 8.

Specifically, in situations where the lamp module operates in the stop lamp lighting mode, the lighting guide 400 may have the maximum light-emitting surface area. To this end, the solenoid drive unit 311 is controlled to be 'Up', and the first subsidiary light source 2, which is provided on the lighting guide 400 or is embodied by the lighting guide 400 itself, is turned on in order to radiate light having the highest luminance while consuming a small amount of power.

In contrast, when the lamp module operates in the tail lamp lighting mode, the lighting guide 400 may have a small light-emitting surface area. To this end, the solenoid drive unit 311 is controlled to be 'Down', and the main light source ① and the first subsidiary light source ② may be concurrently turned on (Case 1), the main light source ① and the second subsidiary light source ③ may be concurrently turned on (Case 2), only the main light source ① may be turned on (Case 3), only the first subsidiary light source ② may be turned on (Case 4), or only the second subsidiary light source ③ may be turned on (Case 5).

In this way, the vehicular active stop and tail lamp module selectively turns on only one light source 500 or at least one of light sources 500 to 503, and controls the light-emitting surface area of the lighting guide 400, which is visible to the driver in the following vehicle, using the solenoid drive unit 311, thereby optimizing visibility in accordance with the traveling condition.

For example, the lamp module is controlled in a way such that at least two of the light sources 500 to 503 are concurrently turned on when the vehicle travels on a road section in which visibility is bad and such that only one light source is turned on when the vehicle travels on a road section in which visibility is good, thereby making it possible to actively respond to the traveling conditions of the vehicle.

As is apparent from the above description, the vehicular active stop and tail lamp module may offer the following various effects.

First, it is possible to create a visual effect of radiating light having various luminous intensities from a single light source as if a plurality of light sources were used, by moving the light source and the lighting guide and thus varying the light-emitting surface area of the lighting guide.

Second, it is possible to increase the freedom of space design when only one light source is provided in the lamp housing.

Third, when a plurality of light sources are provided in the lamp housing, it is possible to control the lamp module to be operated in various modes including a stop lamp lighting mode and a tail lamp lighting mode by selectively turning on one or more light sources and controlling the movement of the lighting guide using the solenoid drive unit.

Possible effects are not limited to the above-mentioned effects, and other effects may be provided according to the implementations described above.

While the vehicular active stop and tail lamp modules according to various examples have been described in detail with reference to the accompanying drawings, implementations are not necessarily limited to the above-described examples, as other modifications, variations or equivalent arrangements may be implemented.

What is claimed is:

1. A vehicular light module comprising:
    a light source configured to have a position that is adjustable longitudinally along a direction in which light radiates from the light source;
    a lighting guide that is movably disposed and that is configured to reflect and diffuse the light radiated from the light source;
    a moving unit configured to move the lighting guide to adjust the reflection and the diffusion of the light radiated from the light source by the lighting guide; and
    a movable plate coupled to the moving unit and configured to connect the moving unit with the lighting guide,
    wherein the lighting guide comprises a plurality of guide panels that are hingedly coupled to the movable plate and configured to allow variation of an angle between the plurality of guide panels and the movable plate.

2. The vehicular light module according to claim 1, further comprising a housing configured to accommodate and mount the light source, the lighting guide, and the moving unit.

3. The vehicular light module according to claim 2, further comprising a moving guide unit configured to guide a movement of the lighting guide.

4. The vehicular light module according to claim 3, wherein the moving guide unit comprises:
    a first retainer part fitted at one end thereof into a moving slot located in a back surface of the lighting guide; and
    a second retainer part positioned opposite to the first retainer part and coupled to a mounting portion provided on the housing via a ball joint connection.

5. The vehicular light module according to claim 1, wherein the movable plate is configured to connect the moving unit with the light source.

6. The vehicular light module according to claim 1, wherein the light source and the lighting guide are disposed on a first side of the movable plate facing the direction in which light radiates from the light source, and the moving unit is disposed on a second side of the movable plate facing a direction that is opposite to the direction in which light radiates from the light source.

7. The vehicular light module according to claim 1, wherein each of the plurality of guide panels is longitudinally adjustable between a square shape and a rectangular shape.

8. The vehicular light module according to claim 1, wherein each of the plurality of guide panels has a width that increases with increasing distance from the movable plate.

9. The vehicular light module according to claim 1, wherein the light source comprises:
    an LED module configured to generate light having a predetermined luminance;
    a diffusing plate configured to diffuse light that is radiated from the LED module;
    a back plate coupled to the movable plate and configured to accommodate the LED module and the diffusing plate, the back plate configured to connect the light source to the moving unit; and
    an LED cover configured to cover the LED module accommodated in the back plate.

10. The vehicular light module according to claim 9, wherein the back plate of the light source is integral with the movable plate.

11. The vehicular light module according to claim 1, wherein the moving unit comprises:
    a movable rod coupled at an end thereof to the movable plate; and
    a solenoid drive unit configured to move the movable rod.

12. The vehicular light module according to claim 1, wherein the moving unit is configured to move the light source and the lighting guide between a first configuration corresponding to a tail lighting mode and a second configuration corresponding to a stop lighting mode,
    wherein a first surface area of the lighting guide in the first configuration corresponding to the tail lighting mode is smaller than a second surface area of the lighting guide in the second configuration corresponding to the stop lighting mode, as viewed from the direction in which light radiates from the light source.

13. The vehicular light module according to claim 1, wherein the moving unit is configured to move the light source and the lighting guide between a first configuration corresponding to a tail lighting mode and a second configuration corresponding to a stop lighting mode,
    wherein a first diameter defined by outer ends of the plurality of guide panels of the lighting guide in the first configuration corresponding to the tail lighting mode is smaller than a second diameter defined by the outer ends of the plurality of guide panels of the lighting guide in the second configuration corresponding to the stop lighting mode, as viewed from the direction in which light radiates from the light source.

14. A vehicular light module comprising:
    a housing disposed at a rear portion of a vehicle body;
    at least two light sources disposed in the housing;
    a lighting guide that is movably disposed and that is configured to converge and diffuse, in a rearward direction of the vehicle body, light that is radiated from at least one of the at least two light sources; and a moving unit configured to move the lighting guide to adjust the convergence and the diffusion of the light radiated from the at least two light sources by the lighting guide, wherein, in a tail lighting mode:
- at least one of the at least two light sources is turned on, and
- the moving unit moves the lighting guide in a manner such that a first surface area of the lighting guide in a stop lighting mode is larger than a second surface area of the lighting guide in the tail lighting mode, as viewed from a direction in which light radiates from the at least two light sources.

15. The vehicular light module according to claim 14, further comprising a movable plate coupled to the moving unit and configured to connect the lighting guide to the moving unit, wherein the at least two light sources comprise at least two of:
- a main light source disposed on the movable plate;
- a first subsidiary light source disposed on the lighting guide; or
- a second subsidiary light source disposed on an inner surface of the housing.

16. The vehicular light module according to claim 15, wherein:

the first subsidiary light source of the at least two light sources is turned on in the stop lighting mode.

* * * * *